United States Patent [19]
Abecassis

[11] Patent Number: 5,253,940
[45] Date of Patent: Oct. 19, 1993

[54] USER SELECTABLE NUMERIC KEYCAPS LAYOUT

[76] Inventor: Max Abecassis, 19020 NE. 20th Ave., Miami, Fla. 33179

[21] Appl. No.: 836,976

[22] Filed: Feb. 19, 1992

[51] Int. Cl.$^5$ .............................................. B41J 5/08
[52] U.S. Cl. .................................. 400/495; 400/490; 400/719; 379/110
[58] Field of Search ...................... 400/490, 495, 719; 379/110

[56] References Cited

U.S. PATENT DOCUMENTS

| | | | |
|---|---|---|---|
| 2,350,787 | 6/1944 | Martin et al. | 400/490 |
| 3,995,123 | 11/1976 | Wilson | 379/110 |
| 4,088,837 | 5/1978 | Singer | 400/495 |
| 4,100,402 | 7/1978 | Lundstrom et al. | 400/495 |
| 4,123,641 | 10/1978 | Murata | 400/495 |
| 4,349,286 | 9/1982 | Blaser et al. | 400/495 |
| 4,906,117 | 3/1990 | Birdwell | 400/495 |
| 4,920,432 | 4/1990 | Eggers et al. | 360/33.1 |
| 4,947,244 | 8/1990 | Fenwick et al. | 358/86 |
| 5,029,260 | 7/1991 | Rollason | 400/489 |

OTHER PUBLICATIONS

"Data Cal" Premier 1992, Computer Productivity Enhancements, Data-cal Corp., Arizona.
Goran Wikell, "The layout of digits on pushbutton telephones" *Tele* Magazine (Jan. 1982).
Karp et al. "Functionally Alterable (hand) Calculator Using Self-Identifying Replaceable Keys" IBM Technical Disclosure Bulletin, vol. 17, No. 1, Jun. 74, pp. 309-310.
Cooper et al. "Changeable Array Keyboard" IBM Technical Disclosure Bulletin, vol. 11, No. 5, Nov. 68, p. 524.
IBM Technical Disclosure Bulletin, vol. 30, No. 1, Jun. 87 "Compact Keyboard Based on G Layout".

*Primary Examiner*—Edgar S. Burr
*Assistant Examiner*—Anthony H. Nguyen

[57] ABSTRACT

Enhancements to computer keyboards and calculator devices are provided that permit a user to select the function and labelling of said device's numeric keypad to conform to either the 123 layout or the 789 layout. The enhancements comprising labelling means for selectively labelling the numeric keypad keys as either a 123 layout or as a 789 layout; switching means for changing the signal associated with each key independent of the application; and circuit board means for transmitting the signals associated with either layout.

1 Claim, 3 Drawing Sheets

FIG. 1
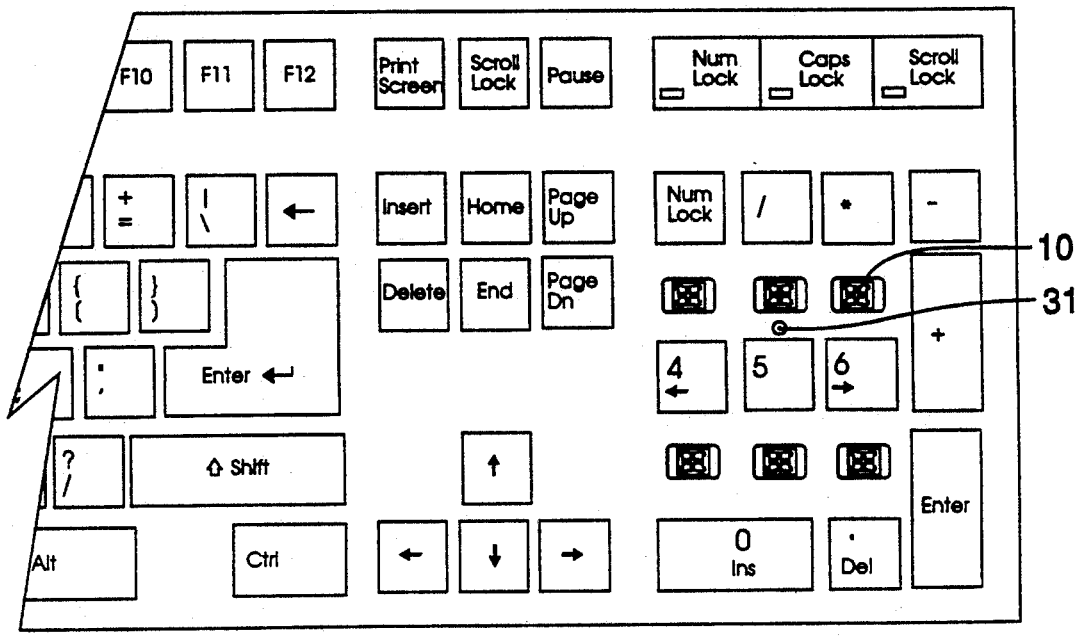
FIG. 2
FIG. 3 FIG. 4
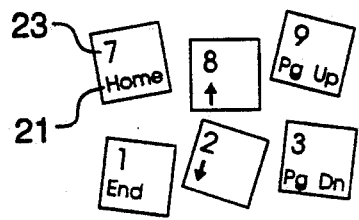 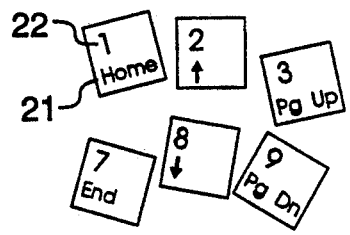
FIG. 5

USER SELECTABLE NUMERIC KEYCAPS LAYOUT

BACKGROUND OF THE INVENTION

1. Field of the Invention

This invention relates to enhancements to computer keyboards and calculator devices that provides consumers a low cost easily configurable means by which they may select to arrange the numeric keycaps within the numeric keypad of a computer keyboard or calculator in a manner consistent with the layout found in the telephone and remote control numeric keypad.

The present invention permits a user to select the function and labelling of said device's numeric keypad to conform to either the 123 layout, as in telephone devices, or the 789 layout, presently utilized in calculators. The enhancements comprising labelling means for selectively labelling the numeric keypad keys as either a 123 layout or as a 789 layout; switching means for changing the signal associated with each key independent of the application; and circuit board means for transmitting the signals associated with either layout.

2. Background of the Prior Art

The numeric keypad on computer keyboards and calculators is currently arranged in a rectangular 3×3+1 grid with the keycaps and functions for the numbers 7,8, and 9 located in the top row, known in the art as the 789 layout. While this numeric keypad layout is similar in its grid arrangement to that found on the telephone, electronic remote control units, and other household products incorporating a numeric keypad, the location of the 7,8,9 keys on these devices are in the bottom row. This latter arrangement with the keycaps for the numbers 1,2, and 3 located in the top row is referred to as the 123 layout.

Goran Wikell's article "The Layout of Digits on Pushbutton Telephones", Tele 1/82 is an excellent summary of the human engineering issues raised by the inconsistencies in the forms and function between these two layouts. In support of the 123 layout the summary of the article states: "Reported experimental studies indicate that the 123 pattern is to be preferred, and that it is favorable with respect to speed and correctness in use." The quality and extent of the bibliography that is included in the article is evidence of the efforts already devoted to the subject. While simple logic and the data in the article supports a unified single standard layout, the article concludes in supporting a 123 layout for telephone devices. However, the article fails to argue and propose a method whereby calculators and similar devices would eventually abandon the 789 layout in favor of the 123 layout.

The independent historical developments that generated the 123 and 789 layouts resulted in the setting of international and domestic standards that assigned devices incorporating the numeric keypad one or the other of the layouts depending on the function of the device. The presumption was that devices incorporating a numeric keypad would serve either as calculators, and therefore follow the turn of the century mechanical calculator 789 layout, or serve as telephones, utilizing the 123 layout consistent with the alphanumeric function of the keys. The ever increasing use of computer/modems and other such multi-function devices, and the general proliferation of numeric keypad devices, renders this presumption of single function devices and dual standards as shortsighted. The IBM technical disclosure Bulletin Vol. 28 No. 2 July 1985 "Ergonomic Keyboard Design For Telephony-Oriented Work Station" provides illustrations of a computer keyboard wherein the numeric keypad is of the 123 layout rather than the 789 layout common to the computer industry. This telephony keyboard clearly attempts to provide a single multi-function layout.

There exists a number of other approaches in the prior art that address the problem presented by the two opposing numeric keypad layouts. The following approaches are reviewed here to provide a contrast to the novel approach and intent of the present invention.

Lundstrom et al., U.S. Pat. No. 4,100,402 "Keyboard Key With Changeable Indicia" discloses an elegant method of providing the user with the ability to change the designation of the key. However, this approach may not be adequate in the case of numeric keys containing labelling in addition to that of the number. In addition, the signals reconfiguration that is required to change a 789 layout to a 123 layout is not found in Lundstrom. An inspection of the construction of most personal computer keyboards reveals that the keycaps are of a simple construction and design. Each keycap is of a single mold that includes a female connector that permits the easy insertion and removal from the male post on the keyboard. Therefore, there is no significant cost advantage of Lundstrom's labeling scheme or similar schemes as opposed to the replacement of the keycap itself, especially when keycap labelling is permanent. It is expected that once the customer selects the layout that they prefer (presumably 123) the selection will be permanent, even if it can be quite easily reversed. A replaceable keycap method has the additional advantage of providing a low cost labelling option to the user while retaining the overall "look and feel" of the existing keypad. Data-Cal Corporation, Chandler, Ariz., utilizes the principle of replaceable keycaps to offer user installed color coordinated "Shift", "Alt", and "Ctrl" keys corresponding to word processing templates. However, the variety of keycap labelling products offered by Data-Cal do not include numeric keycaps corresponding to the 123 layout. Further, while Data-Cal utilizes custom imprinting of computer keycaps to offer a customized "Wordperfect Keyboard", it fails to provide a keyboard incorporating the 123 layout, or to suggest providing a keyboard where the signals as well as the corresponding labels associated with a key are determined by the user.

Bender, U.S. Pat. No. 3,865,994, "Combination Telephone and Calculator" discloses a combination telephone and calculator, and teaches "a two position switch 14. The switch is designed to switch the use of the touch tone buttons 11 between their normal use for dialing and as the input to a calculator." (Col. 2, lines 14–17). In a computer keyboard, the signal generated by depressing a key is not dependent on the function that the signal serves within the software. Bender does not suggest a switch or circuit board configuration jumper that serves to configure the operation of the said circuit board so that the signal associated with a key location is independent of the function (data-entry, calculator, telephone dialing, word processing, etc.) that the device serves.

Singer, U.S. Pat. No. 4,088,837, "Combination Telephone and Calculator with Common Keyboard having Reversible Indicia" provides for keys in a combination telephone-calculator that are selectably useable as input means for the telephone set and for the calculator. While Singer addresses the issue of layout, Singer elects to provide a means to change the telephone 123 layout to permit its use as a calculator with a 789 layout. This approach unlike the prior patent to Bender suffers from the perception that one needs to provide the means by which the signals from the keys and presumably the labelling of each key are continually shifted according to the function to be performed. "Therefore, each key will produce a different signal, depending whether the selection means 22 is switched to telephone or calculator operation." Col. 4, lines 1–4. Singer "hardwires" the 123 and 789 layout conflicts rather than provide for a single layout. This will lead to the kinds of errors of which Singer Col. 3, lines 36–46 Col. 4, line 1 is an example. The numeral 3 in the telephone mode would be switched to the numeral 9 in the calculator mode, not the numeral 7 as indicated in Singer. Furthermore, Singer ignores the alpha relabelling requirements of the telephone, and would not therefore contribute to the relabelling requirements of a computer numeric keypad where the keys contain other labels in addition to the numbers (for cursor control). Therefore, in regard to the physical treatment of the keys and their relabelling, the objectives, and the results that are achieved, Singer does contribute to the setting of a single keypad standard.

Foreign patents Japan 58-129533, GB 2100095 A, and GB 2128384 A refer to the use of the numeric keypad to input character data. These patents teach a dedicated key to switch from numeric to alpha modes. As such they do not contribute to the subject matter.

The prior art has failed to disclose or suggest that the consumer should have the means to set for themselves, if they are so inclined, a single numeric keypad layout standard that is independent of the device application. The prior art fails to suggest the manner and method of promoting and achieving the transition to a logically consistent numeric keypad layout standard based on offering the public the opportunity to lead the establishment of such a standard. Further, as indicated previously, the prior art has failed to teach the method and elements that will inexpensively provide consumers with such an opportunity.

SUMMARY AND OBJECTS OF THE INVENTION

In view of the studies that have been conducted, it is evident that there exists a need to provide a single and unified numeric keypad standard for computer keyboards, calculators, telephones, and remote control units. Further, since the standard setting institutions have failed to provide such a standard, it is also evident that there exists a need for an alternative method to arrive at a single standard.

It is therefore, an object of the present invention to provide an alternative method to arrive at a single standard for numeric keypad layouts. Said method relies on the present invention providing consumers the means to set for themselves a single numeric keypad standard, and in this manner lead to the abandonment of layouts inconsistent with the layout incorporated on telephone devices.

It is also an object of the present invention to provide keyboard manufacturers the architecture and methods that will permit them to supply consumers with inexpensive and easily configurable means to select the numeric keypad layout.

It is also an object of the present invention to provide a non-installed set of numeric keycaps similar in construction and look and feel to existing keycaps, to permit the user to label the numeric keypad according to the desired layout.

It is another object of the present invention to provide the necessary designs for each key to permit the labelling of the numeric keycaps consistent with all of their individual functions.

It is yet another object of the present invention to provide two sets of numeric keycaps similar in construction and look and feel to existing keycaps, each containing the appropriate function labels in addition to the numeric labels to permit the user to configure the numeric keypad according to the desired layout and retain the labelling required by the other functions of each key.

It is yet another object of the present invention to provide a set of labels to be affixed by users to the keycaps to label the numeric keypad according to the desired layout.

It is yet another object of the present invention to provide a switch to permit the user to configure the signals of the keys in the numeric keypad to be consistent with the selected layout.

It is yet another object of the present invention to provide a key on the keyboard similar to the <Num Lock>, or the utilization of the <Num Lock> key in combination with another key, or any other suitable key arrangement that will permit the user to configure the signals of the keys in the numeric keypad to be consistent with the selected layout.

It is yet another object of the present invention to provide a circuit board configuration jumper or other such similar device to permit the user to configure the signals of the keys in the numeric keypad to be consistent with the selected layout.

It is yet another object of the present invention to incorporate on at least one of the keycaps a circuit board jumper or other such similar device to permit the user to auto-configure the signals of the keys in the numeric keypad to be consistent with the selected layout by the location that said key is inserted in the numeric keypad.

Briefly, these and other objects of the present invention are accomplished by two sets of elements. One set addresses the labelling of the keys and the other set addresses the configuration of the keys so that the signals transmitted are consistent with the labelling of the keys.

With these and other features, advantages, and objects of this invention, the manner of attaining the invention is apparent by reference to the following detailed description of the invention taken in conjunction with the accompanying drawings and appended claims.

BRIEF DESCRIPTION OF THE DRAWINGS

FIG. 1 is a partial top view of a computer keyboard according to the present invention with keys 1, 2, 3, 7, 8, 9 not inserted;

FIG. 2 is a bottom view of a keycap;

FIG. 3 is a top view of a set of numeric keycaps consistent with the 789 layout;

FIG. 4 is a top view of a set of the numeric keycaps consistent with the 123 layout;

FIG. 5 is a top view of a slide switch to permit the selection between a 123 and 789 layout;

DETAILED DESCRIPTION OF THE PREFERRED EMBODIMENTS

Figure 6:
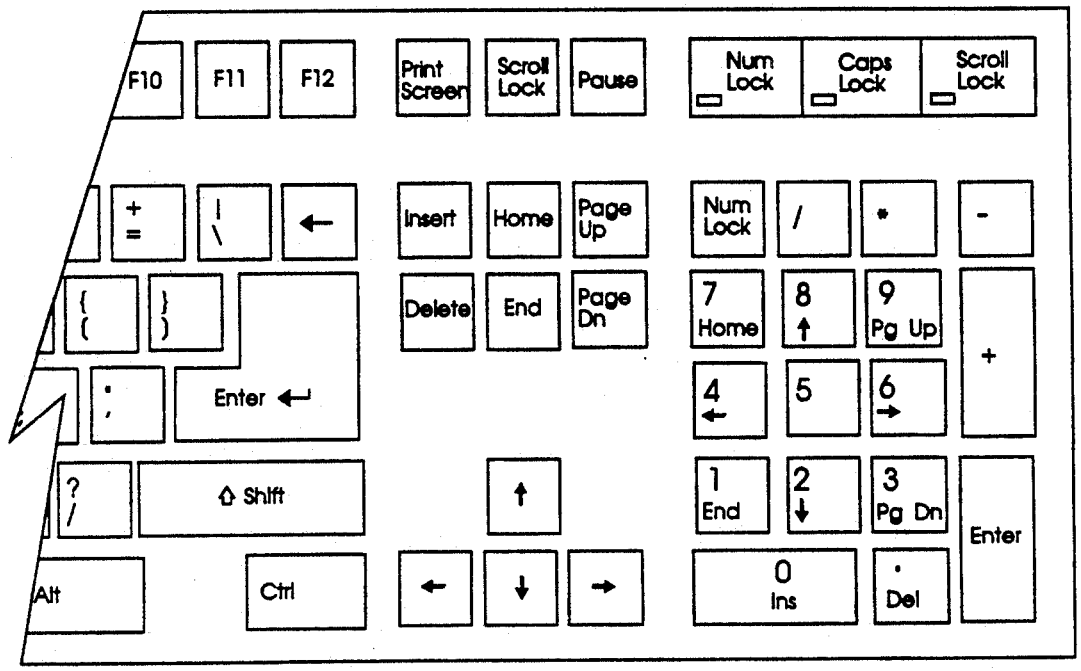
FIG. 6 is a top view of the keyboard of FIG. 1 with the numeric keycaps installed in the 789 layout.

Referring now in detail to the drawings wherein like parts are designated by like reference numerals throughout, there is illustrated in FIG. 1 part of an industry standard 101 key enhanced keyboard with the keycaps for the numerals 1,2,3,7,8,9 not installed revealing the mating structure of the mechanical keyswitch: a + shaped male plastic post 10. FIG. 2 shows the underside of a single mold plastic keycap showing the + shaped female receptacle 11 that secures the keycap to the keyswitch of the keyboard of FIG. 1.

According to the present invention, users of the keyboard will be provided with two sets of numeric keycaps, the first set for a 789 layout shown in FIG. 3 and the second set for a 123 layout shown in FIG. 4. Each numeral has the appropriate cursor control label according to the numeric keypad layout selected. For example in the 123 layout, the "Home" 21 label is on the keycap having the numeral "1" label 22, while in the 789 layout, the "Home" label 21 is on the keycap having the numeral "7" label 23. Were it not for the cursor control functions associated with these keys, only one set of keys would be required to label a 123 or 789 layout. This would be the case for the calculator embodiment of the present invention.

Referring now to FIG. 5, the FIG. illustrates a slide switch to permit the user to designate the signals associated with each of the mechanical keyswitches of the numeric keypad. When the switch is in the 123 position, the signal generated by depressing the keyswitch will be consistent with having the 123 keycap set installed. When the switch is in the 789 position the signals generated by depressing the keyswitches will be consistent with the 789 layout. Since it is expected that the initial setting by the user of this switch will not be changed, it is not necessary that the location of the switch be on the top of the keyboard. A computer keyboard manufactured by Chicony Electronics, Co. FCC ID E8H-5IKKB-5161 incorporates an X-A switch on the underside of the keyboard. The teachings of said switch and associated circuit board are incorporated herein by reference. A number of other possible alternative electrical switch means could be used to permit the user to perform this function. For example, in addition to other electrical switches,: i) a micro switch located in this case directly above the numeral 5 key 31; ii) a circuit printed board jumper utilized to configure the operation of a circuit board as in the existing art; iii) a jumper incorporated into one of the keycaps such that depending on where the keycap is installed the circuit would or would not be completed, thereby auto-configuring the signals from the keyswitches; iv) a firmware switch that could be set by depressing a combination of keys, for instance, simultaneously depressing the <Ctrl> <Alt> and <Num Lock> keys.

Figure 8:
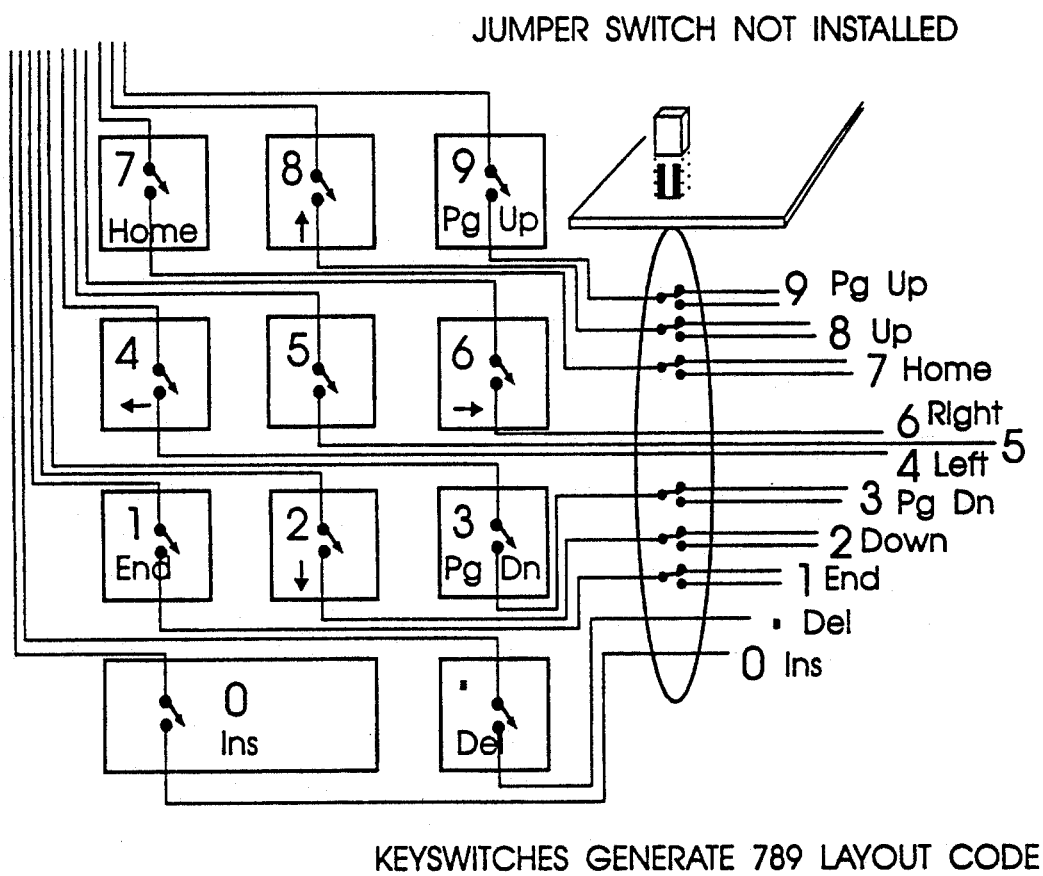
FIG. 8 illustrates the jumper switch arrangement of the present invention.

To clarify, as shown in FIG. 8, a jumper is a simple electrical connecting device that when inserted on two electricity conducting poles establishes an electrical connection (jumping) between both poles. When not inserted, no electrical connection between the poles exists. The installation of the jumper on the poles configures the operation of the circuitry associated with said two poles. In this manner the jumper serves a function similar to that of a simple electrical switch. These small devices approximately 3/16"×3/16"×1/16" are commonly utilized in personal computers and circuit boards.

The size and simplicity of a jumper permits incorporating its structure and function (switching) in a keycap or any other carrier serving at least one additional function. In the case of the keycap, the female + post may be constructed of electrically conducting material providing an electrical connection between two metal posts incorporated in the male + post of the keyswitch, the keyswitch providing an uninterrupted electrical contact of the male posts with the circuit board. In this manner a jumper keycap would serve the electrical connecting function of the jumper described previously and the above described function of relabelling the keyswitch according to the user choice.

A "firmware" reconfiguration switch can also be provided that is equivalent to the architecture that provides the existing <Num Lock> function. Differences between the firmware key of the present invention and the <Num Lock> key are: i) that since the layout switching function of conventional keyboards does not justify an addtitional function key, the present firmware key could piggyback on the <Num Lock> or another key by requiring the depression of a combination key(s); ii) a circuit board memory would be provided to retain the last key arrangement setting; and iii) there is no need to provide an LED for this function, as in the Num Lock LED, since the placement of the numeric keys serves that purpose.

Existing keyboard printed board circuitry will be modified, as per design and construction methods and standards well practiced in the art, to provide the additional circuitry associated with the switch implemented. The patent to Bender, previously cited, shows a switch and associated numeric keypad circuitry, the teachings of which are incorporated herein by reference. In the present invention, the additional circuitry provides for the appropriate signal output corresponding to each of the two numeric layout switch settings.

Figure 7:
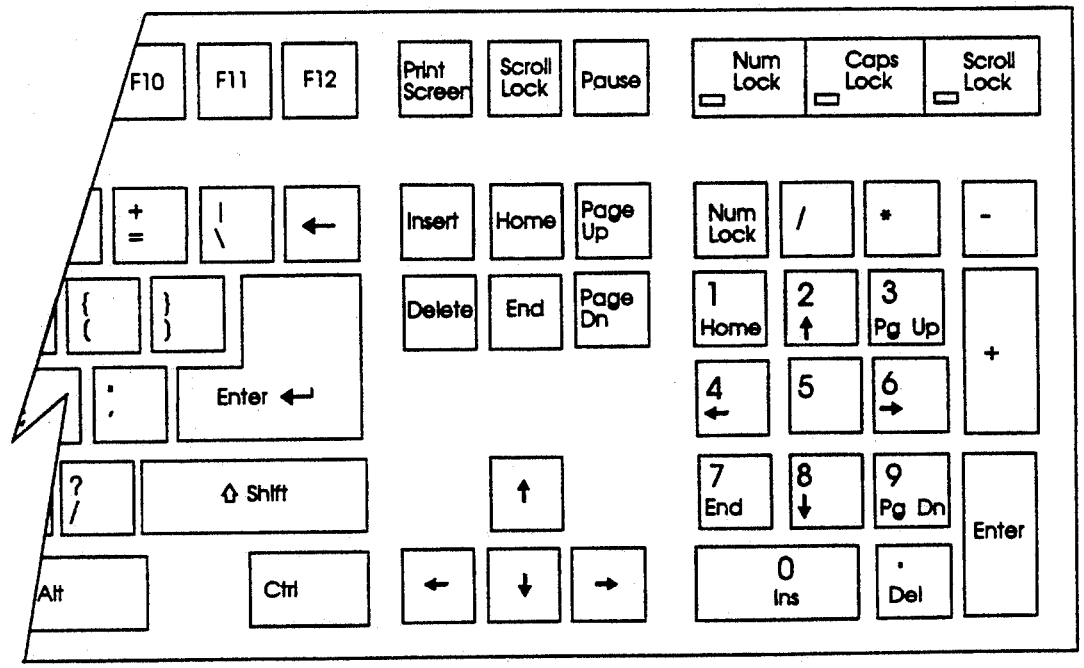
FIG. 7 is a top view of the keyboard of FIG. 1 with the numeric keycaps installed in the 123 layout.

After the user decides on a numeric keypad layout, namely 123 or 789, the user will utilize the switch provided, i.e. shown in FIG. 5 or the firmware switch, to configure the numeric keypad. The user will then install the corresponding set of keycaps on the appropriate keyswitches. FIG. 6 shows the keyboard of FIG. 1 with the numeric keycaps installed in the 789 layout. This layout selection corresponds to that of existing keyboard arrangements. In contrast, FIG. 7 shows the keyboard of FIG. 1 with the numeric keycaps in the 123 layout installed.

An embodiment of the present invention for use with a calculator is similar to that discussed above. The only significant departure would be that there may not be a need to provide two sets of keycaps if there is not an alternate function associated with a particular numeric keyswitch. The numeric keycaps for the 7, 8, and 9 could thus be interchanged with the keycaps for 1, 2, and 3 without concern for alternate functions performed by these keyswitches.

Finally, the teachings of the present invention can be utilized to customize the function and or labelling of other keyswitches. Some such examples are: 1) alpha layouts other than the qwerty layout, 2) bilingual alpha keyboard, 3) special functions such as telephone layouts, 4) software application dependent layouts, e.g. wordperfect function key labelling.

While the presently preferred form of the present invention has been set forth, it is to be understood that the invention is not limited thereby. In particular, the steps of the inventive process are interchangeable and are also considered examples of one of many possible implementations and applications of the inventive concepts. It is also understood that the specific detail shown are merely illustrative and that the invention may be carried out in other ways without departing from the true spirit and scope.

What is claimed is:

1. A method of providing a numeric keypad with both selectively changeable and unchangeable functions comprising:

providing a first set of key caps to configure the keypad in a 123 layout;

providing a second set of key caps to configure the keypad in a 789 layout;

providing each of said key caps except the number 5 key cap of each set with a machine control function;

interchanging the machine control functions relative to the first set of key caps such that the functions contained on keys 1, 2, and 3, respectively, of the first set of key caps are contained on keys 7, 8, and 9, respectively, of the second set of key caps, and the functions contained on keys 7, 8, and 9, respectively, of the first set of key caps are contained on keys 1, 2, and 3, respectively, of the second set of key caps;

selecting one of said sets of key caps;

installing the selected set on a numeric keyboard; and, providing switch means to enable machine operation consistent with the selected one of said set of key caps.

* * * * *